(12) United States Patent
Welland et al.

(10) Patent No.: US 8,279,415 B2
(45) Date of Patent: Oct. 2, 2012

(54) METHOD AND APPARATUS FOR DISTANCE MEASUREMENT USING OPTICAL BEAM

(76) Inventors: Robert Welland, Seattle, WA (US); Bryan M. Willman, Kirkland, WA (US)

( * ) Notice: Subject to any disclaimer, the term of this patent is extended or adjusted under 35 U.S.C. 154(b) by 575 days.

(21) Appl. No.: 12/371,332

(22) Filed: Feb. 13, 2009

(65) Prior Publication Data

US 2010/0208233 A1    Aug. 19, 2010

(51) Int. Cl.
   *G01C 3/08*    (2006.01)
(52) U.S. Cl. ....... 356/5.01; 356/3.01; 356/5.1; 356/5.15
(58) Field of Classification Search ........ 356/3.01–28.5, 356/139.01–139.1
   See application file for complete search history.

(56) References Cited

U.S. PATENT DOCUMENTS

| | | |
|---|---|---|
| 5,633,706 A | 5/1997 | Cho et al. |
| 6,363,036 B1 * | 3/2002 | Siepmann .................... 368/113 |
| 2002/0032543 A1 | 3/2002 | Saito et al. |
| 2002/0067475 A1 * | 6/2002 | Waibel et al. ................ 356/4.01 |
| 2002/0075471 A1 * | 6/2002 | Holec ........................... 356/3.01 |
| 2002/0131035 A1 * | 9/2002 | Watanabe et al. .............. 356/5.1 |
| 2005/0231709 A1 | 10/2005 | Inaba et al. |
| 2007/0091295 A1 | 4/2007 | Xu et al. |

* cited by examiner

*Primary Examiner* — Luke Ratcliffe
(74) *Attorney, Agent, or Firm* — JW Law Group; James M Wu

(57) ABSTRACT

A method and apparatus for measuring a distance are disclosed. A measuring device includes a timer, a counter, an optical emitter, an optical receiver, and a distance computing element. In one embodiment, the timer provides a sequence of signals and the counter counts pulses in a loop. The loop includes an electrical path and an optical path. While an optical emitter such as a laser can emit outgoing beams, an optical receiver such as a photodiode receives return beams from the reflective surface. The reflective surface reflects the return beam in accordance with the outgoing beam. The distance computing element measures a distance in response to the outgoing and return beams.

28 Claims, 7 Drawing Sheets

METHOD AND APPARATUS FOR DISTANCE MEASUREMENT USING OPTICAL BEAM

FIELD

The exemplary embodiment(s) of the present invention relates to the field of measuring distances. More specifically, the exemplary embodiment(s) of the present invention relates to devices for accurate distance measurement using optical beams.

BACKGROUND

Measuring distances to high accuracy is typically an important function in a wide range of fields, such as machine tools, manufacturing, automotive, and construction. Conventional measurement devices, however, have various limitations. For example, linear scales devices, which use incremental encoding, are typically required to be attached to an object being measured, and have relatively tight alignment requirements. In addition, conventional laser interferometers are typically bulky and expensive.

To improve measurement, conventional time-of-flight lasers have been used. One such approach is fine-grained time-base measurement, which, for example, can be on the order of tens of picoseconds, and statistical sampling of many trials can increase resolution. However, this approach is limited by the time resolution. Another time-of-flight approach is the Fizeau method, which measures distance via a phase locked loop (PLL) locking to a beat-frequency. A drawback associated with this approach is that it has a relatively long convergence time, and is sensitive to variations in distance. Another drawback with the conventional approach is that conventional measuring devices are typically less flexible, and they are typically required to operate in control environments such as a laboratory or a testing center.

SUMMARY

A method and apparatus for measuring a distance using optical beams are disclosed. A measuring device includes a timer, a counter, an optical emitter, an optical receiver, and a distance computing element. In one embodiment, the timer provides a sequence of signals and the counter counts pulses in a loop. The loop includes an electrical path and an optical path. While an optical emitter such as a laser can emit outgoing beams, an optical receiver such as a photodiode receives return beams from the reflective surface. The reflective surface reflects the return beam in accordance with the outgoing beam. The distance computing element measures a distance in response to the outgoing and return beams.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1A:
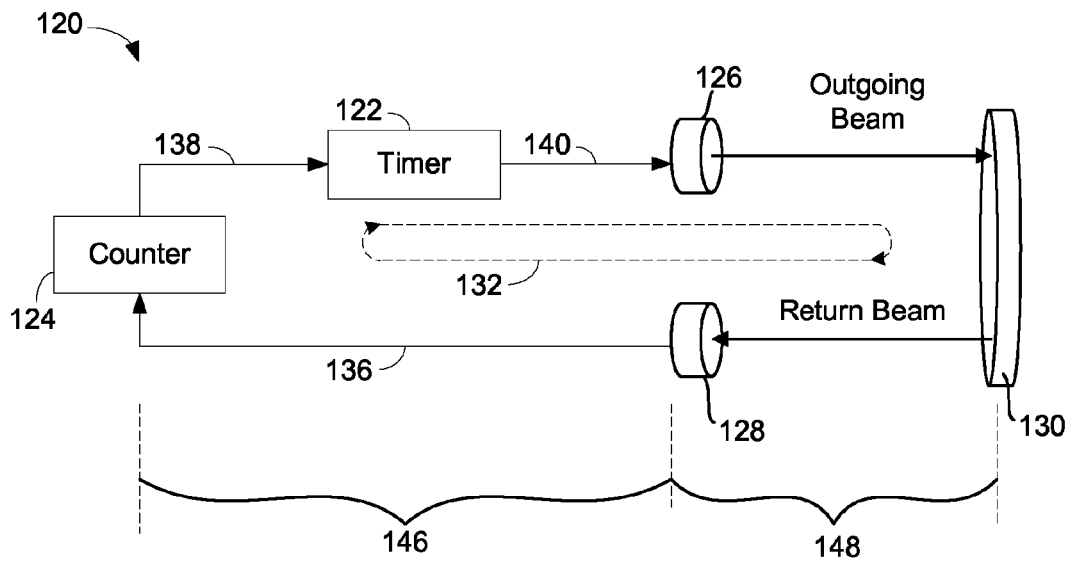
FIG. 1A is a block diagram illustrating a measurement device using a loop in accordance with one embodiment of the present invention.

Embodiments of the present invention are described herein in the context of a method, system, circuit and apparatus for measuring distances.

Those of ordinary skills in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the exemplary embodiments of the present invention as illustrated in the accompanying drawings. The same reference indicators (or numbers) will be used throughout the drawings and the following detailed description to refer to the same or like parts.

In the interest of clarity, not all of the standard hardware and routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skills in the art having the benefit of this disclosure.

In accordance with the embodiment(s) of the present invention, the components, process steps, and/or data structures described herein may be implemented using various types of operating systems, computing platforms, computer programs, and/or general purpose machines. In addition, those of ordinary skills in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

A measuring device includes a timer, a counter, an optical emitter, an optical receiver, and a distance computing element. In one embodiment, the timer provides a sequence of signals and the counter counts pulses in a loop. The loop includes an electrical path and an optical path. While an optical emitter such as a laser can emit outgoing beams, an optical receiver such as a photodiode receives return beams from the reflective surface. The reflective surface reflects the return beam in accordance with the outgoing beam. The distance computing element measures a distance in response to the outgoing and return beams.

FIG. 1A is a block diagram illustrating a distance measurement device 120 using a loop 132 in accordance with one embodiment of the present invention. Device 120 includes a timer 122, a counter 124, a laser 126, a photodiode 128, and a reflective surface 130. Reflective surface 130 can be any materials that are capable of reflecting visible light and/or optical wavelengths. Loop 132, in one embodiment, includes an electrical portion (or path) and an optical portion (or path). It should be noted that the underlying concept of the embodiment does not change if one or more functional elements were added to or removed from system 120.

Loop 132 is formed between the outgoing beam, the return beam, connections 136-140, counter 124, and timer 122. It should be noted that counter 124 and timer 122 do not need to be part of the loop as long as they are coupled to the loop whereby they can perform their functions. On the other hand, loop 132 can also include other circuits.

Device 120 illustrates an apparatus for measuring a distance using an optical path as well as an electrical path. In one embodiment, device 120 includes an analog loop circuit and a digital path circuit. The analog loop circuit, not shown in FIG. 1A, is configured to receive an enable signal and provide a first clock, wherein the first clock oscillates when the enable signal is asserted. The enable signal, for example, activates an oscillating path, which includes an electrical path component 146 and an optical path component 148. The analog loop circuit is further capable of sending an outgoing beam to reflective surface 130, and receiving a return beam from reflective surface 130 as shown in FIG. 1A. The outgoing beam and the return beam are part of the optical path component 148. The digital path circuit is capable of receiving the first clock and the second clock, and providing the enable signal and an interface. The digital path circuit, which includes counter 124 capable of counting pulses of the first clock when the enable signal is asserted, determines a distance between a measuring point and reflective surface 130. Note that the measuring point is a reference point in connection with device 120. For example, the reference point may be at the surface of optical device 126.

Embodiments of the present invention illustrate a measuring process capable of determining a distance between a point of measuring device 120 and reflective surface 130. Device 120 includes an electrical path 146 and a partly external optical path 148, wherein paths 146-148 together form a loop 132. A pulse composed of electrical signal(s) and optical light can cycle through loop 132. For example, each time loop 132 cycles, a pulse travels through electrical path (as electrons) 136 and activates an optical device 126 (e.g. a laser) which sends the pulse as photons to a reflective object 130 over a distance to which is being measured. The return pulse (photons) are detected by a photodiode 128 and converted back to electrons which carry the pulse around the rest of electrical path 136. A counter 124 in electrical path 136 counts each of the round trips or loop of a pulse (i.e. counting pulses). The counts are herein referred to as "clicks", and counter 124 is referred to as a "click counter" which counts pulses that travel around electrical/optical loop 132. Measuring device 120 also has a timer or a time keeping device that keeps time in some device specific unit, which is herein referred to as "ticks". In one example, device 120 is calibrated in terms of ticks per some fixed number of clicks. Alternatively, calibration can also set device 120 in clicks per some fixed number of ticks.

An advantage of using time-of-flight of light for measurement is that it improves measurement accuracy and offers higher resolution. It should be noted that speed of light is usually faster than speed of electronic implementation. For example, while light travels at a speed of 3 femtoseconds ($10^{-15}$ seconds) per a micron, electronic operation operates at the GHz ($10^{-9}$ seconds) range. The speed difference between electronic operation and light movements results a gap of approximately six (6) orders of magnitude ($10^6$) for electronic device based optical path measurements.

Similar to drift current in semiconductors, it is difficult to discern fine increments of time associated with small distances. However, a large number of small contributions can be added together in a "time amplification" approach to discern time increments. In one embodiment, an electrical path 146 and an optical path 148 can contribute in an electro-optic system that oscillates at a high speed, and counter 124 counts a number of pulses in the sample. Electrical path component delay average, however, may be constant over a large number of samples thereby an optical path length can be determined by at least a predetermined number of pulses over the sample period.

Figure 1B:
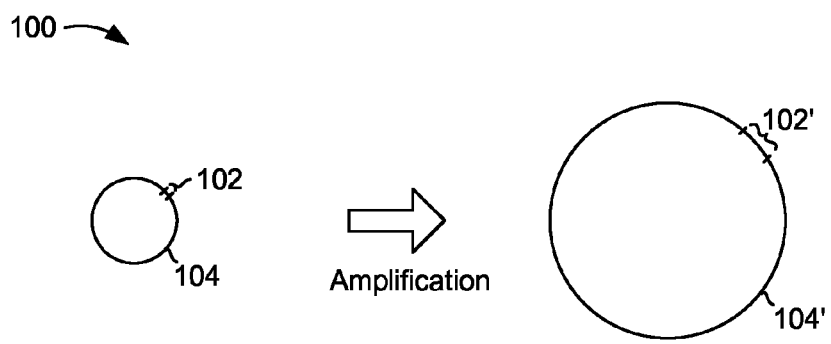
FIG. 1B is a diagram illustrating a time amplification concept utilized in embodiments of the present invention.

FIG. 1B is a diagram illustrating a time amplification concept 100 utilized in embodiments of the present invention. An optical path contribution 102 may be on the order of femtoseconds ($10^{-15}$), while an electrical path contribution 104 may be on the order of nanoseconds ($10^{-9}$), yielding a ratio of $10^6$. Amplification (e.g., a million times) can result in a modified optical path contribution 102' on the order of nanoseconds ($10^{-9}$), and a modified electrical path contribution 104' on the order of milliseconds ($10^{-3}$), also yielding a ratio of about $10^6$.

For a sufficiently constant temperature of operation and/or other ambient conditions of operation, an average delay through the electrical path can be constant. To measure the time-of-flight of light, the relatively small time delay (e.g., optical path contribution 102) can be amplified (e.g., to modified contribution 102'). In one embodiment, the amplification can be done by measuring a delay of a free running loop for a predetermined and relatively large number of cycles. In this fashion, electrical jitter and noise can essentially be converted into a constant value, thus negating associated effects.

Figure 2A:
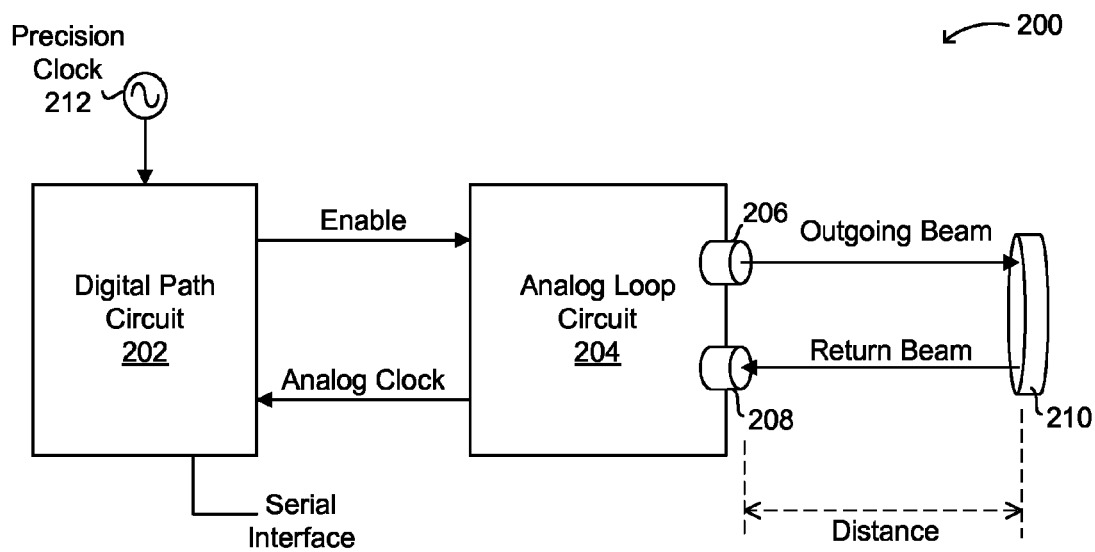
FIG. 2A is a schematic block diagram illustrating an example distance measuring system in accordance with embodiments of the present invention.

FIG. 2A is a schematic block diagram illustrating an example distance measuring system 200 in accordance with embodiments of the present invention. System 200 includes a digital path circuit 202, an analog loop circuit 204, and a reflective surface 210. Reflective surface 210 can be a mirror, retro-reflector, or any suitable reflecting structure. It should be noted that the underlying concept of the embodiment does not change if one or more functional elements were added to or removed from system 200.

Digital path circuit 202 can receive precision clock or clock 212 (e.g., a time-base clock) and an analog clock, and can provide an enable signal to analog loop circuit 204, as well as a serial interface to the outside world. For example, the serial interfaces shown may be universal serial bus (USB) interfaces, but any suitable data interfaces (e.g., parallel, wireless, graphical, etc.) can also be accommodated herein. Analog loop circuit 204 can control laser 206 to generate an outgoing beam. Reflective surface 210 can reflect the outgoing beam to provide a return beam staying along an optical path length. The return beam is subsequently received in photodiode 208. Thus, the optical path includes the outgoing beam path and the return beam paths, wherein the distance between reflective surface 210 and laser 206/photodiode 208 is measurable. To provide accurate measurement, system 200 may need to be calibrated in accordance with the application(s).

Figure 2B:
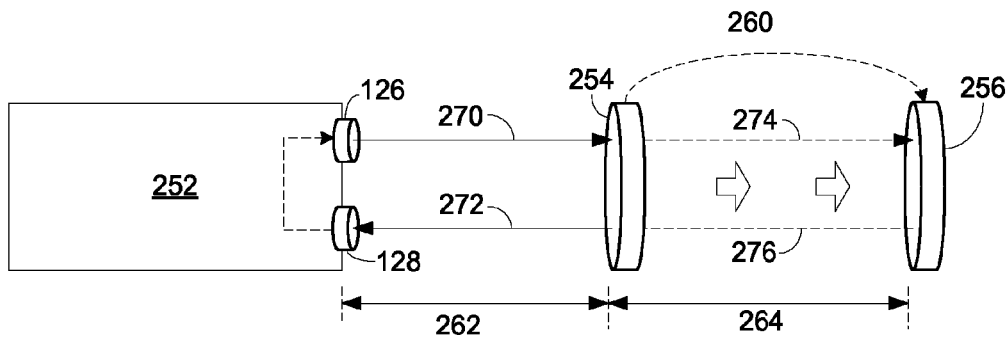
FIG. 2B is a block diagram illustrating a process of calibrating the measuring system in accordance with embodiments of the present invention.

FIG. 2B is a block diagram 250 illustrating a process of calibrating the measuring system in accordance with embodiments of the present invention. Diagram 200 illustrates a measuring device 252 and a reflective surface 254, wherein measuring device 252 further includes a laser 126 and a photodiode 128. Laser 126 emits optical light by converting electrical energy into optical energy, while photodiode 128 detects optical light and is capable of converting optical energy into electrical energy. Reflective surface 254 is situated a first distance 262 away from device 252. It should be noted that reflective surface 256, which can be the same element of reflective surface 254, is situated first distance 262 and second distance 264 away from device 252.

In one embodiment, device 252 is required to be calibrated by reference to a pair of objects 254-256 at a known distance apart as indicated by numeral 264. The distance 264 between the reference objects 254-256 may be established using standard metrology techniques. In one example, a process of device calibration is performed in a controlled environment. The parameter involved in controlled environment includes, but not limited to, temperature, atmospheric pressure, humidity, interferences, and medium.

In one embodiment, device 252 runs against the first reference using a fixed device 254 specific time interval (e.g. a number of ticks such as 1,000,000) and reports back the number pulses that traveled around the electro-optical loop over that time (a number of clicks such as 800,000). The above described mode can be referred to as "loops per time" or clicks per X ticks mode, wherein X can be an integer. Device 252 runs again against the second reference object 256 in the same way and generates a different value. The difference in the values divided by the distance between the two reference objects provides a calibrated metric for device 252. For example, if the $1^{st}$ reference is measured at 800,000 clicks per 1,000,000 ticks, and the $2^{nd}$ reference is measured at 400,000 clicks per 1,000,000 ticks, and the two references are exactly 1 millimeter ("mm") apart, the calibration value is 400,000 clicks per 1,000,000 ticks per mm. It should be noted that the number may get smaller as the reflective object moves further away from device 252.

Alternatively, device 252 is run against the first reference using a fixed number of loops around the electro-optical path. The distance to the $1^{st}$ reference object is reported as 700,000 ticks per 2,000,000 clicks. This mode is "time per fixed number of loops" or "ticks per x clicks" mode wherein x is an integer. Device 252 is run again against the $2^{nd}$ reference object, and reports a $2^{nd}$ value, which is, for example, 350,000 ticks per 2,000,000 clicks. The difference between the $1^{st}$ and $2^{nd}$ values divided by the distance 264 is the calibrated metric of device 252. For example, if the $1^{st}$ reference is measured at 700,000 ticks per 2,000,000 clicks and the $2^{nd}$ reference is measured at 350,000 ticks per 2,000,000 clicks, and the two references are 2 mm apart, the calibration value is 175,000 ticks per 2,000,000 clicks per mm.

From above described embodiments, device 252 needs to report C clicks per preset T ticks, or T ticks per preset C clicks, wherein C and T are integers. Note that the actual length of a tick in real-time is unimportant so long as it is reasonably stable as well as sufficient samples taken, whereby the length of a tick can be statistically valid. The actual number of pulses that travel around the electrical-optical path (clicks) is unimportant so long as the number is large enough to be statistically valid.

It will be apparent to a person skilled in the art that multiple calibration samples, at multiple reference distances, and with various environmental conditions such as temperature variations may be combined with standard statistical techniques to improve the accuracy the device. It will further be apparent to a person skilled in the art that calibration may be performed based on per device basis, or for a batch of devices known to behave consistently. Moreover, it will be apparent that the devices may be recalibrated any time based on applications as long as the above described procedures are followed.

It will also be apparent to a person skilled in the art that while the device will normally be calibrated in some standard distance unit such as meters, it could be calibrated in any arbitrary units desired, including a unit distance associated with the stroke range of some device or machine. In one embodiment, the measuring device can be calibrated by careful setup against a known distance artifact. Alternatively, the device can be calibrated by comparing reported values from two target distances that vary by a known artifact distance.

The measuring device also includes computation circuitry. The computations described above may be performed by the device itself with a supporting computation element such as a microprocessor packaged within the device. Alternatively, the device uses an external computation element (such as a computer or machine controller) via a communication circuitry.

In one embodiment, a calibration table or formula is used to allow a user to calibrate the device after the device is manufactured. Different calibration table may be used for different devices which can be identified by, for example, electronic serial numbers. The table allows an end user to calibrate the measuring device by selecting a relevant calibration table in accordance with device serial number. Likewise, the use of calibration tables is aided if the device returns a report of its internal environmental conditions (i.e. temperature and voltage).

Since the device is by nature relative (it reports a number which varies with distance, not absolute distance) in application, it will be zeroed against one or more references in view of applications. The zeroing is done by reading the distance to the zero reference and then remembering the answer. This answer is subtracted from the measurement answers to obtain a distance relative to the zero reference, and then scaled by the calibration values to convert to some standard of measure.

A person skilled in the art will recognize that embodiment(s) of the present invention is applicable to a broad range of applications. For example, for a micrometer under a setting of precise measuring instrument, the device might reside in a fixed anvil, and be calibrated against a moveable anvil when it is resting against the fixed anvil. The measurement result read by the micrometer should have accuracy within a few micro meters (microns). A person skilled in the art will realize that a given machine, instrument, or other application may use multiple of the devices of the present invention at the same time.

In the Clicks mode, the device, for example, is applied against the zero reference using 2,000,000 ticks as a time unit and returns 3,500,400,000 clicks. The device is applied again against a reflective surface of the object being measured, and returns 3,000,200,000 clicks per 2,000,000 ticks. The controller subsequently consults with a calibration table relevant to the device and identifies that the calibration value, for instance, is 100,000,000 clicks per 2,000,000 ticks per micron. As such, the object being measured is 3,500,400,000−3,000,200,000=500,200,000/100,000,000 or 5.2 microns from the reference.

In the Ticks mode, the device, for example, is applied against the zero reference using 1,000,000,000 clicks as the pulse count and returns 700,000 ticks. The device is applied again against a reflective surface of the object being measured and returns 400,000 ticks. The controller subsequently consults with the calibration table relevant to the device and finds the calibration value is 100,000 ticks per mm per 1,000,000,000 clicks. As such, the object being measured has a distance of 3 mm. (700,000−400,000=300,000 ticks/100,000 ticks per 1,000,000,000 clicks=>3 mm.).

It will be apparent to a person skilled in the art that the accuracy of the result can be improved by measuring and accounting environmental or ambient conditions between the device and the surfaces being measured.

Figure 3:
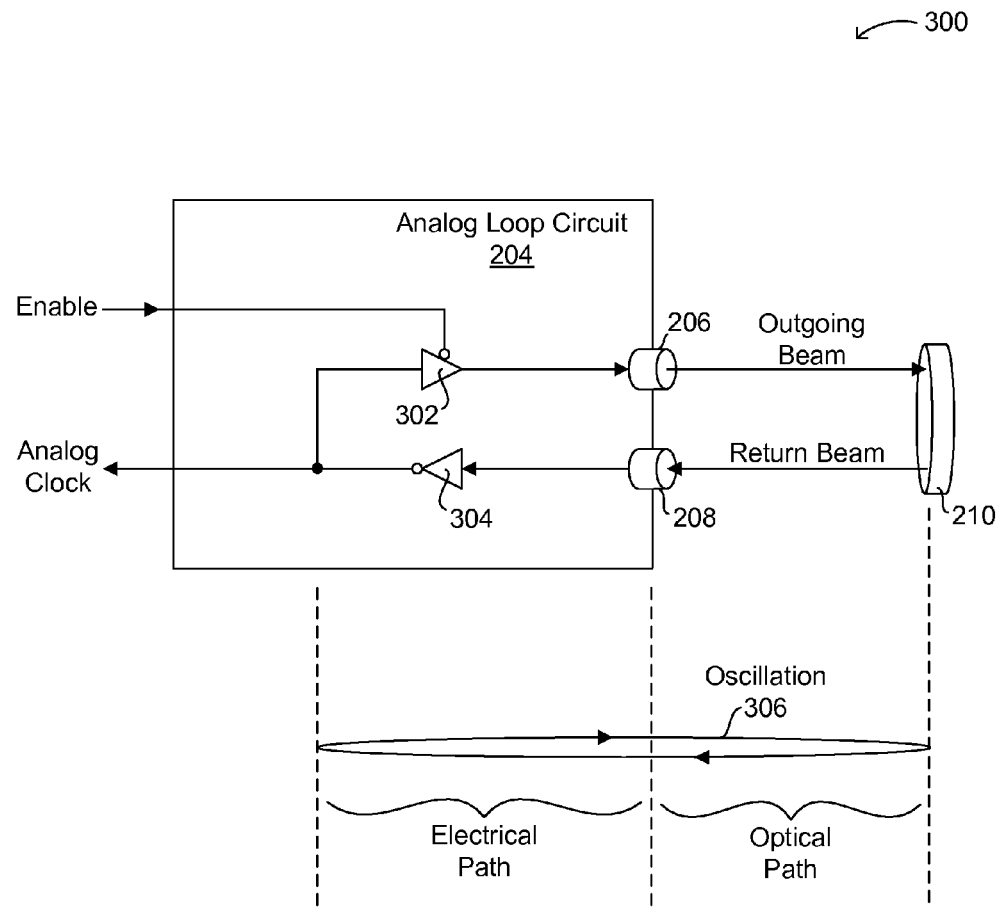
FIG. 3 is a schematic block diagram illustrating an example analog loop circuit in accordance with embodiments of the present invention.

FIG. 3 is a schematic block diagram illustrating an example 300 analog loop circuit in accordance with embodiments of the present invention. Analog loop circuit 204 can include an enable-controlled buffer 302 coupled to laser 206, and an inverter 304 coupled to photodiode 208. The analog clock signal can thus be a series of pulses when enabled due to the oscillating circuit structure resulting from an odd number of inverting stages. As shown, oscillation 306 can occur over a loop formed from the electrical path and the optical path (e.g., between laser 206/photodiode 208 and reflective surface 210). In this fashion, the electrical path contribution may be fixed, and the optical path contribution may be variable based on a distance desired for measurement.

Particular embodiments can utilize a frequency of an oscillating path that includes the electrical path component contribution plus the optical path component contribution. This frequency is related to the distance for measurement, and is derived over time using a counter. In this fashion, particular embodiments may avoid isolated measurements that might produce a high noise level, and rather accumulate light/distance contributions over time.

Laser 206 can be any suitable device for generating an outgoing beam (e.g., a vertical-cavity surface-emitting laser (VCSEL), a light-emitting diode (LED), etc.). Also, photodiode 208 can be any suitable device for detecting a return beam, including any device having an intrinsic layer that is sensitive to light (e.g., a PiN diode). Also, reflective surface 210 can be any suitable reflective surface (e.g., a retro-reflector reflective surface where incoming light is reflected in parallel such that the path length is the same regardless of where the light contacts the reflective surface, any plane reflective surface, a micro-electro-mechanical systems (MEMS) device, a beam splitter to allow for a single beam, or even some ordinary reflective surface of the target object, etc.).

In a time-of-flight equation, a total time equals an electrical time contribution plus an optical time contribution. As discussed above, the electrical time contribution is about six orders of magnitude greater than the optical time contribution. If the oscillating loop is allowed to run freely for a very large number of cycles, then the optical time contribution can be amplified enough to be measurable. For example, $10^6$ cycles can effectively turn 3 femtoseconds into 3 ns of accumulated delay, resulting in a measurable delay quantity. Further, for a relatively large sample period, the electrical path contribution may average to a measurable constant, so long as the device temperature (or other operating conditions) is not allowed to vary significantly, or is otherwise compensated.

The internal time intervals of the device and the ratios of the length of the electrical path and optical path are not necessary known for calibrating and using the device. During calibration, the distance, however, between the $1^{st}$ reference object and the $2^{nd}$ reference object is known. Also, the internal environmental data such as temperatures reported by the device, and/or external environmental data such as temperatures recorded by the calibration environment may be known. Furthermore, the device may optionally report, and/or receive a unique individual identification ("ID") or a group IDs, which can be used to bind calibration data to specific devices. The calibrating entity merely runs the device against pairs of reference objects with known distances apart (or a single reference object moved to a known distance) and computes the calibration table from the changes in Clicks or Ticks observed.

The calibration of the device may be very efficiently performed, and the accuracy and confidence in the device improved, by performing multiple (perhaps very many) calibrations over a range of reference distances and environmental circumstances. The calibration of the device may be facilitated by the use of a robot which uses an interferometer to establish many reference distances, and calibrates the device against these many distances.

It is important to realize that calibration does not depend on any known location on the device itself, and no alignment with any physical surface of the device or its container, nor any alignment with any witness mark, is required. It will be obvious to a person skilled in the art that whether to use Clicks mode (Clicks per T Ticks) or Ticks mode (Ticks per C Clicks), and whether to use smaller or larger input values for T or C, will be established by experience and the application at hand.

Figure 4:
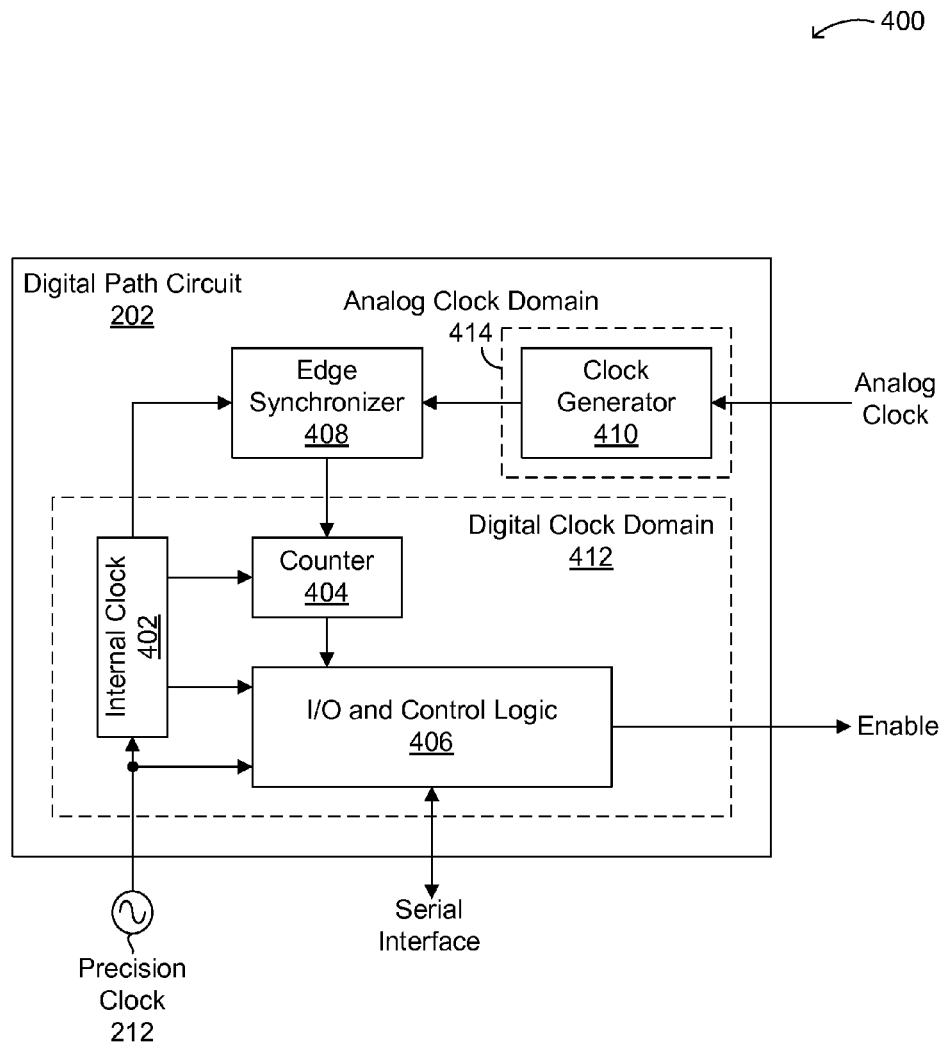
FIG. 4 is a schematic block diagram illustrating an example digital path circuit in accordance with embodiments of the present invention.

FIG. 4 is a schematic block diagram illustrating an example 400 digital path circuit in accordance with embodiments of the present invention. Digital path circuit 202 can include analog clock domain 414 and digital clock domain 412 operating regions. An analog clock signal (e.g., greater than about 1 GHz) from analog loop circuit 204 can be provided to clock generator 410 in analog clock domain 414. For example, clock generator 410 can be a divide-by-16 clock generator, resulting in a clock input to edge synchronizer that is in the 100 MHz range.

Precision time-base/clock 212 can provide a clock signal to internal clock control 402, and I/O and control logic 406. Edge synchronizer 408 can receive a signal output from clock generator 410 and a clock signal from internal clock 402, and provide a synchronized signal to counter 404 (e.g., a 32-bit "up" counter). For example, edge synchronizer 408 can line up rising and falling clock edges from clock generator 410 to the clock signal from internal clock 402. I/O and control logic 406 can provide an interface (e.g., a parallel interface, a serial interface, USB, etc.) to the outside world, and an enable signal for activating oscillation via analog loop circuit 204. For example, counter 404 may be reset upon power-up, when the enable signal is deactivated, and/or in response to commands via the interface.

Alternatively, a large number of loops can be timed and then latched. A "down" counter can be started upon latching of the timed large number of loops. When this counter reaches zero, the time clock can again be latched. Thus, rather than using loops per time, time per X number of loops can be employed for measurement determination in digital path circuit 202.

The exemplary embodiment(s) of the present invention includes various processing steps, which will be described below. The steps of the embodiments may be embodied in machine or computer executable instructions. The instructions can be used to cause a general purpose or special purpose system, which is programmed with the instructions, to perform the steps of particular embodiments. Alternatively, steps of particular embodiments may be performed by specific hardware components that contain hard-wired logic for performing the steps, or by any combination of programmed computer components and custom hardware components.

Figure 5:
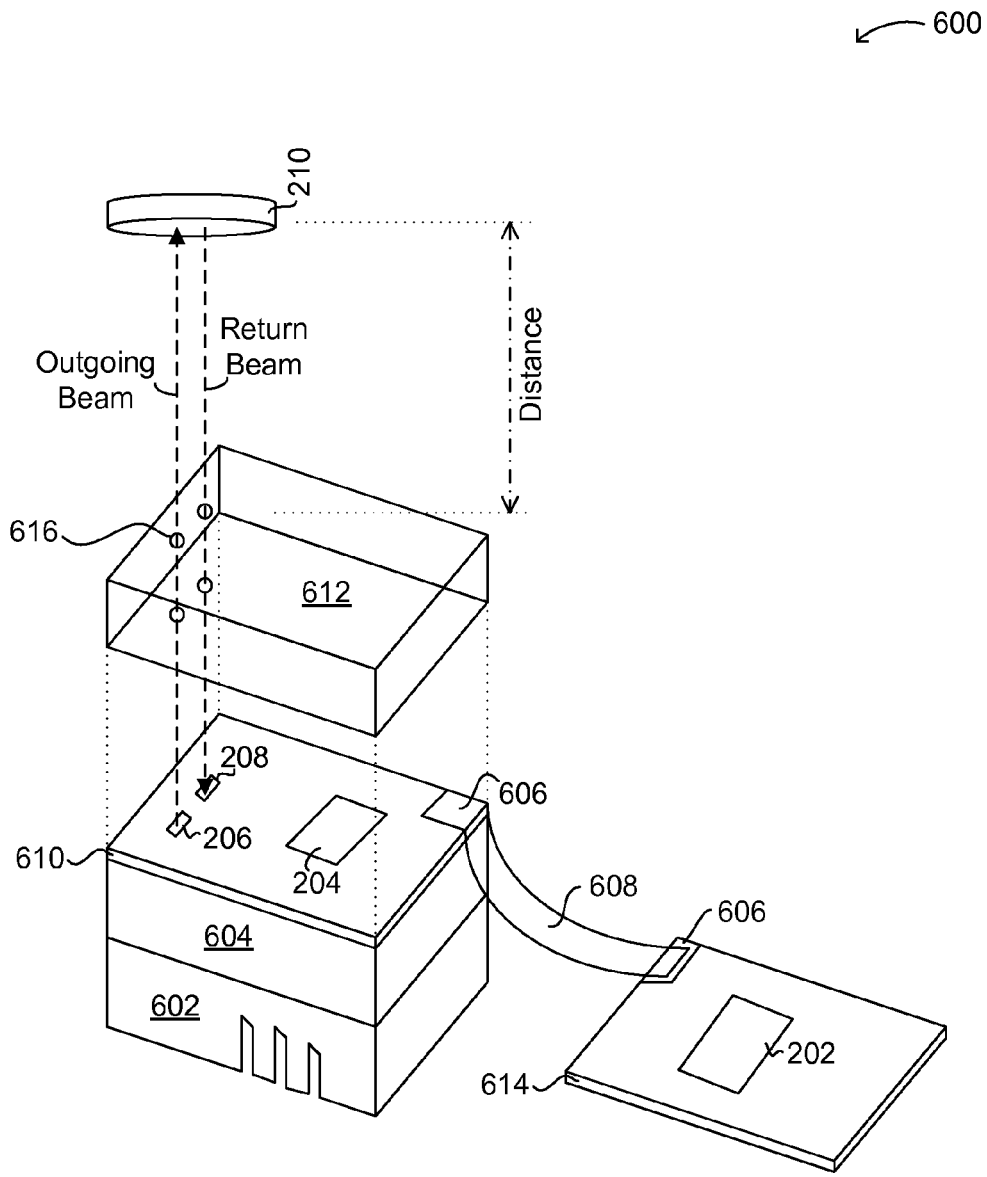
FIG. 5 is a hardware diagram illustrating an example distance measurement device structure in accordance with embodiments of the present invention.

FIG. 5 is a hardware diagram illustrating an example distance measurement device structure 600 in accordance with embodiments of the present invention. The optical head 612 may be about 4 mm×4 mm×6 mm, and the circuits (e.g., analog loop circuit 204) may be operable at about 3.3 V. Other operating voltages (e.g., in a range of from about 1.2 V to about 5.5 V, and including from about 2.5 V to about 4.5 V, etc.) can also be utilized in particular embodiments, and may depend on integrated circuit (IC) technologies used therein. In addition, high production commodity components can be utilized in particular embodiments, resulting in a low cost solution.

VCSEL laser 206 and photodiode 208, as well as analog loop circuit 204, can be mounted on a substrate 610 (e.g., a printed-circuit board (PCB) substrate for a multi-chip module). Thermo-electric cooler 604 can be positioned under substrate 610, and over heat sink 602. For example, thermo-electric cooler 604 may be about 2 mm in height. Flex connectors 606 can be used to attach flex cable 608 between substrate 610 and substrate 614. Substrate 614 can support a digital section, including digital path circuit 202. Lens system or optical head 612 can include openings 616 for outgoing and return beams from reflective surface 210. Particular embodiments can include a caliper, whereby reflective surface 210 can be in a movable part for distance measurements. Other example applications include use in machine parts, manufacturing, etc., and may be suitable for measurements in a micrometer range.

Figure 6:
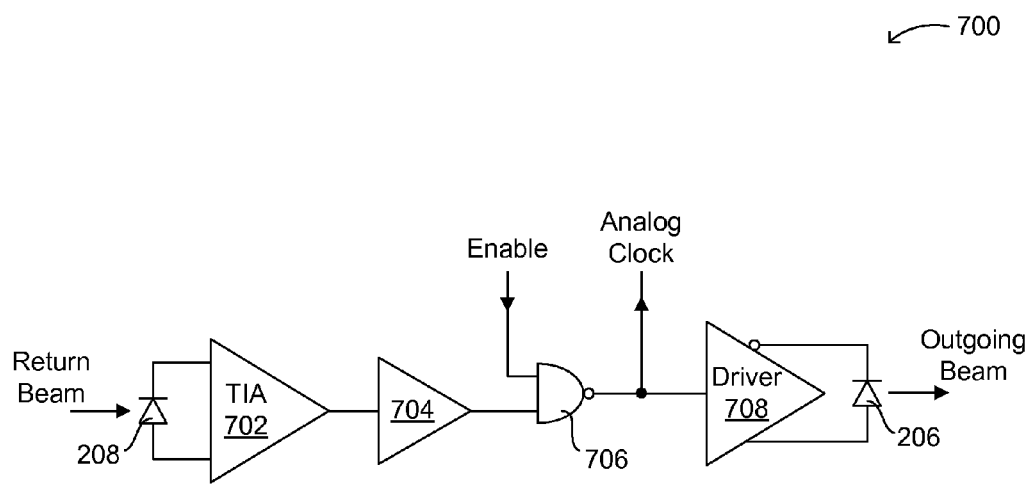
FIG. 6 is a schematic block diagram illustrating example circuitry for an analog loop in accordance with embodiments of the present invention.

FIG. 6 is a schematic block diagram illustrating example circuitry 700 for an analog loop in accordance with embodiments of the present invention. The return beam can be received by photodiode 208 for detection and amplification via trans-impedance amplifier (TIA) 702. Photodiode 208 capable of converting optical energy to electrical energy provides an electrical signal in response to a return beam. TIA 702 may be subsequently used to amplify (e.g., about 60 dB, or more, of amplification) a voltage from a current.

Limiting amplifier 704 can receive the signal from TIA 702, and provide a standard voltage or logic signal (e.g., logic high '1' level, logic low '0' level, as detected via voltage levels, such as greater than about 2 V, lower than about 1.2 V, etc.) to NAND gate 706. NAND gate 706 may also receive the enable signal, and provide an analog clock signal to digital path circuit 202. NAND gate 706 also provides an inverter function for oscillation when the enable signal is asserted (e.g., enable='1'). Laser driver 708 can receive the analog clock signal, and provide a drive signal to VCSEL laser 206 for generating the output beam. Of course, other suitable circuit components (e.g., amplifiers, logic gates, photo detectors, and/or light generators) can also be utilized in particular embodiments.

Figure 7:
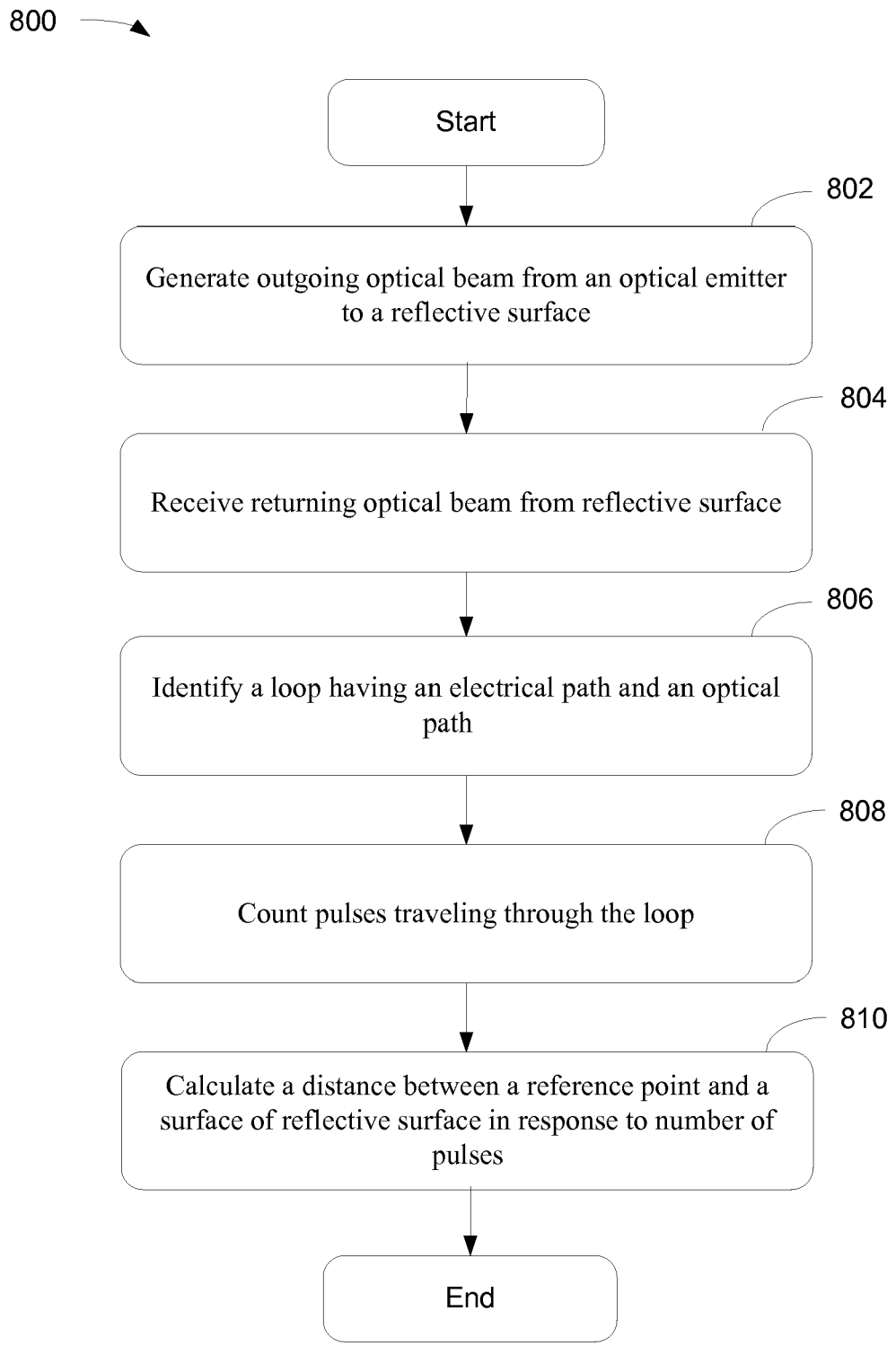
FIG. 7 is a flow diagram illustrating an exemplary process of measuring a distance using a loop in accordance with embodiments of the present invention.

FIG. 7 is a flow diagram of an example method 800 of operating a distance measurement device in accordance with embodiments of the present invention. At block 802, a process of measuring a distance generates outgoing optical beams from an optical emitter to a reflective surface. The optical emitter, for example, is a laser or laser device capable of converting an electrical signal to an optical light.

At block 804, the process receives the returning optical beams from the reflective surface, wherein the reflective surface can be a mirror, a smooth metal surface, or a surface that is capable of reflecting light. In one embodiment, the process enables a photodiode, which is able to convert optical light to an electrical signal(s).

At block 806, the process identifies a loop, which is composed of an electrical path and an optical path. In one embodiment, the process is capable of amplifying optical delay detected on the optical path.

At block 808, the process counts pulses traveling through the loop. In one embodiment, portion of electrical signal(s) and portion of optical signal(s) are identified in a pulse. To recognize a pulse, the process emits an outgoing optical light and subsequently, detects a returning optical light. Upon converting the returning optical light into an electrical signal, the process forwards the electrical signal to the optical emitting device.

At block 810, the process calculates a distance between a reference point and a surface of the reflective surface in response to number of pulses. To obtain accurate measurement, the process needs to calibrate the measuring device before it can be used. In one embodiment, the measuring device is calibrated using a calibration method of two reference points. Alternatively, the process can calibrate a measuring device with a predefined calibrating table. The table, for example, can be supplied by the manufacture of the measuring device. The process, in one embodiment, is capable of computing a light travel distance between a surface of light emitter device and a surface of reflective surface in response to clicks, ticks, and calibrations.

While particular embodiments of the present invention have been shown and described, it will be obvious to those skills in the art that, based upon the teachings herein, changes and modifications may be made without departing from this invention and its broader aspects. Therefore, the appended claims are intended to encompass within their scope all such changes and modifications as are within the true spirit and scope of the exemplary embodiment(s) of is present invention.

What is claimed is:

1. A measuring device, comprising:
   a tick count timer configured to provide a sequence of signals;
   an optical emitter coupled to the tick count timer and configured to emit a first beam;
   an optical receiver coupled to the tick count timer and configured to receive a second beam;
   a reflective surface optically coupled to the optical emitter and capable of providing the second beam in accordance with the first beam;
   a loop including electrical path and optical path and configured to pass through the optical emitter, wherein the loop includes an electrical portion and an optical portion capable of facilitating conversion between optical signal and electrical signal;
   a click counter coupled to the loop and configured to count pulse that travels around the loop; and
   a distance computing element coupled to the tick count timer and capable of providing a distance in response to number of pulses.

2. The device of claim 1, wherein the tick count timer includes a counter capable of providing ticks in accordance with counting of time.

3. The device of claim 2, wherein the tick count timer includes an electronic circuit capable of generating number of clicks in response to the first and the second beams.

4. The device of claim 3, wherein an accumulated number of ticks indicates a distance in accordance with a predefined number of ticks.

5. The device of claim 1, wherein the optical emitter is a laser capable of converting electrical energy to an outgoing beam.

6. The device of claim 5, wherein the laser includes a vertical-cavity surface-emitting laser.

7. The device of claim 1, wherein the optical receiver includes a photodiode configured to detect a return beam, wherein the optical receiver is capable of converting optical energy to electrical signal.

8. The device of claim 2, wherein the distance computing element obtains a number of ticks and a number of clicks from the tick count timer.

9. The device of claim 8, wherein the distance is calculated in response to the number of ticks and the number of clicks in accordance with a calibration value.

10. A method of measuring, comprising:
generating a plurality of outgoing optical beams from an optical emitter to a reflective surface;
receiving a plurality of returning optical beams from the reflective surface;
identifying a loop having an electrical path and an optical path;
generating a pulse by converting a first electrical signal to a first optical signal and converting a second optical signal to a second electrical signal;
counting the pulses traveling through the loop; and
calculating a distance between a reference point and a surface of the reflective surface in response to number of pulses.

11. The method of claim 10, further comprising calibrating a measuring device with two reference points.

12. The method of claim 10, further comprising calibrating a measuring device with a predefined calibrating table.

13. The method of claim 10, wherein generating a plurality of outgoing optical beams from an optical emitter includes activating a laser to convert an electrical signal to an optical light.

14. The method of claim 13, wherein receiving a plurality of returning optical beams includes enabling a photodiode to convert optical light to an electrical signal.

15. The method of claim 14, wherein identifying a loop having an electrical path and an optical path further includes amplifying optical delay detected on the optical path.

16. The method of claim 15, wherein counting pulses traveling through the loop includes detecting a pulse by identifying electrical signals and optical signals.

17. The method of claim 16, wherein detecting a pulse includes:
emitting an outgoing optical light;
detecting a returning optical light;
converting the returning optical light into an electrical signal; and
forwarding the electrical signal to the optical emitting device.

18. The method of claim 12, wherein calculating a distance between a reference point and a surface of the reflective surface in response to number of pulses further includes computing a light travel distance between a surface of light emitter device and a surface of reflective surface in response to the pulses and calibrations.

19. A method for determining a distance between a measuring device and a reflective surface, the method comprising:
identifying a loop having an electrical path and an optical path and allowing a pulse to cycle through the loop;
converting the pulse to electrical signal when it travels through the electrical path and converting the pulse to optical signal when it travels through the optical path;
counting clicks in response to number of the pulses of an oscillating signal from an oscillating path, the oscillating path having the electrical path component and the optical path component, the optical path component having an outgoing beam to the reflective surface, and a return beam from the reflective surface;
counting ticks in response to a number of signals from a clock timer in accordance with passage of time; and
computing the distance between the measuring device and the reflective surface in response to the clicks and the ticks.

20. The method of claim 19, further comprising enabling the oscillating path in response to an input at an interface to the measuring device.

21. The method of claim 20, wherein the interface comprises a universal serial bus (USB) interface.

22. The method of claim 19, further comprising enabling the oscillating path such that the sample period is greater than a predetermined time.

23. The method of claim 19, further comprising aligning the reflective surface to a laser in the controller device, the laser generating the outgoing beam.

24. The method of claim 19, further comprising aligning the reflective surface to a photodiode in the controller device, the photodiode detecting the return beam.

25. The method of claim 19, further comprising computing the distance by dividing the number of ticks of the clock per a fixed number of clicks of the oscillating path over a calibration quantity to obtain a distance value.

26. The method of claim 19, further comprising computing the distance by dividing the number of clicks of the oscillating path per a fixed number of ticks of the clock over a calibration quantity to obtain a distance value.

27. An apparatus of measuring, comprising:
means for generating a plurality of outgoing optical beams from an optical emitter to a reflective surface;
means for receiving a plurality of returning optical beams from the reflective surface;
means for identifying a loop having an electrical path and an optical path;
means for generating a pulse by converting a first electrical signal to a first optical signal and converting a second optical signal to a second electrical signal;
means for counting the pulses traveling through the loop; and
means for calculating a distance between a reference point and a surface of the reflective surface in response to number of pulses.

28. The apparatus of claim 27, further comprising means for calibrating a measuring device with two reference points.

* * * * *